(12) United States Patent
Kawai

(10) Patent No.: US 12,391,782 B2
(45) Date of Patent: Aug. 19, 2025

(54) FLUORINATED COPOLYMER COMPOSITION AND CROSSLINKED RUBBER ARTICLE

(71) Applicant: AGC Inc., Tokyo (JP)

(72) Inventor: Tsuyoshi Kawai, Tokyo (JP)

(73) Assignee: AGC Inc., Tokyo (JP)

( * ) Notice: Subject to any disclaimer, the term of this patent is extended or adjusted under 35 U.S.C. 154(b) by 540 days.

(21) Appl. No.: 17/655,416

(22) Filed: Mar. 18, 2022

(65) Prior Publication Data

US 2022/0204675 A1    Jun. 30, 2022

Related U.S. Application Data

(63) Continuation of application No. PCT/JP2020/039268, filed on Oct. 19, 2020.

(30) Foreign Application Priority Data

Oct. 23, 2019  (JP) ................................ 2019-192839

(51) Int. Cl.
*C08F 259/08*    (2006.01)
*C08K 5/14*    (2006.01)
*C08K 5/50*    (2006.01)

(52) U.S. Cl.
CPC .............. *C08F 259/08* (2013.01); *C08K 5/14* (2013.01); *C08K 5/50* (2013.01); *C08F 2810/20* (2013.01)

(58) Field of Classification Search
CPC ...... C08F 259/08; C08F 2810/20; C08K 5/14; C08K 5/50
See application file for complete search history.

(56) References Cited

U.S. PATENT DOCUMENTS

| | | | | |
|---|---|---|---|---|
| 3,876,654 | A | * 4/1975 | Pattison | C08K 5/50 525/326.3 |
| 2002/0177666 | A1 | * 11/2002 | Grootaert | C08K 5/0025 525/326.2 |
| 2016/0032039 | A1 | * 2/2016 | Shimizu | C08F 259/08 525/276 |
| 2016/0369028 | A1 | * 12/2016 | Tonelli | C08J 3/247 |

FOREIGN PATENT DOCUMENTS

| | | |
|---|---|---|
| CN | 105237844 A | 1/2016 |
| CN | 105367955 A | 3/2016 |
| EP | 1 209 175 A1 | 5/2002 |
| JP | 6-306236 A | 11/1994 |
| JP | 10-237253 A | 9/1998 |
| KR | 20070113157 | * 11/2001 |
| WO | WO 2019/009248 A | 1/2019 |

OTHER PUBLICATIONS

International Search Report issued Dec. 15, 2020 in PCT/JP2020/039268, filed on Oct. 19, 2020, 2 pages.

* cited by examiner

*Primary Examiner* — Robert S Jones, Jr.
*Assistant Examiner* — Joshua Caleb Bledsoe
(74) *Attorney, Agent, or Firm* — Oblon, McClelland, Maier & Neustadt, L.L.P.

(57) ABSTRACT

To provide a fluorinated copolymer composition whereby a crosslinked rubber article having a low compression set at high temperature can be formed, and a crosslinked rubber article.
The fluorinated copolymer composition of the present invention comprises a fluorinated copolymer, an organic peroxide, a compound having at least two polymerizable unsaturated bonds and a phosphorus compound having a melting point of 60° C. or lower.

21 Claims, No Drawings

FLUORINATED COPOLYMER COMPOSITION AND CROSSLINKED RUBBER ARTICLE

TECHNICAL FIELD

The present invention relates to a fluorinated copolymer composition and a crosslinked rubber article.

BACKGROUND ART

Crosslinked rubber articles having a fluorinated copolymer crosslinked are excellent in heat resistance, chemical resistance, oil resistance, weather resistance, etc. and thus are widely used in the fields of vehicles, ships, aircraft, general machinery, construction, etc., as sealing materials (e.g. O-rings, packing, oil seals, gaskets) and cushioning materials.

As a fluorinated copolymer composition for producing such crosslinked rubber articles, Patent Document 1 discloses a fluorinated rubber composition comprising a fluorinated rubber obtained by copolymerizing vinylidene fluoride with at least one ethylenic unsaturated monomer copolymerizable with it, an organic peroxide, at least one member selected from a bivalent metal hydroxide and a bivalent metal oxide, and an organic phosphorus compound.

PRIOR ART DOCUMENT

Patent Document

Patent Document 1: JP-A-H06-306236

DISCLOSURE OF INVENTION

Technical Problem

In recent years, there has been a demand for improving properties of crosslinked rubber articles in various fields. Specifically, crosslinked rubber articles having a low compression set at high temperature have been demanded.

To respond to such demands, the present inventor has evaluated a crosslinked rubber article disclosed in Patent Document 1, and as a result found that there is room for improvement on a compression set when a compression set test is carried out at high temperature (hereinafter referred to also as "compression set at high temperature").

The present invention has been made in consideration of the above problem, and the object is to provide a fluorinated copolymer composition whereby a crosslinked rubber article having a low compression set at high temperature can be formed, and a crosslinked rubber article.

Solution to Problem

As a result of an extensive study on the above problem, the present inventor has found that a crosslinked rubber article having a low compression set at high temperature can be obtained by using a fluorinated copolymer composition comprising a fluorinated copolymer, an organic peroxide, a compound having at least two polymerizable unsaturated bonds and a phosphorus compound having a melting point of 60° C. or lower, and thus has arrived at the present invention.

That is, the present inventor has found that the above problem can be solved by the following construction.

[1] A fluorinated copolymer composition comprising a fluorinated copolymer, an organic peroxide, a compound having at least two polymerizable unsaturated bonds and a phosphorus compound having a melting point of 60° C. or lower.
[2] The fluorinated copolymer composition according to [1], wherein the phosphorus compound has a melting point of 35° C. or lower.
[3] The fluorinated copolymer composition according to [1] or [2], wherein the phosphorus compound is a phosphine having an alkyl group.
[4] The fluorinated copolymer composition according to any one of [1] to [3], wherein the fluorinated copolymer is a perfluoropolymer.
[5] The fluorinated copolymer composition according to any one of [1] to [4], wherein the fluorinated copolymer has units based on tetrafluoroethylene and units based on a perfluoro (alkyl vinyl ether).
[6] The fluorinated copolymer composition according to [5], wherein the fluorinated copolymer further has units based on a monomer having at least two polymerizable unsaturated bonds.
[7] The fluorinated copolymer composition according to any one of [1] to [6], wherein the compound having at least two polymerizable unsaturated bonds is a compound having at least two vinyl groups or allyl groups.
[8] The fluorinated copolymer composition according to any one of [1] to [7], wherein the compound having at least two polymerizable unsaturated bonds is a compound represented by the following formula (6):

$$(CR^{61}R^{62}=CR^{63})_2R^{64} \qquad (6)$$

in the formula (6), $R^{61}$, $R^{62}$ and $R^{63}$ each independently represent a hydrogen atom, a fluorine atom, a $C_{1-5}$ alkyl group or a $C_{1-5}$ fluoroalkyl group, $R^{64}$ represents a bivalent $C_{1-18}$ fluorohydrocarbon group or a group having an etheric oxygen atom at a terminal or in a carbon-carbon bond of said fluorohydrocarbon group, and two $R^{61}$, two $R^{62}$ and two $R^{63}$ may be the same or different from each other, respectively.
[9] The fluorinated copolymer composition according to any one of [1] to [8], wherein the phosphorus compound is a trialkylphosphine.
[10] The fluorinated copolymer composition according to any one of [1] to [9], wherein the phosphorus compound is a compound represented by the following formula (7):

$$P(R^{71})_3 \qquad (7)$$

in the formula (7), $R^{71}$ represents a $C_{2-9}$ linear or branched alkyl group, and three $R^{71}$ may be the same or different from one another.
[11] The fluorinated copolymer composition according to [10], wherein in the formula (7), three $R^{71}$ each independently represent a $C_{2-9}$ linear alkyl group.
[12] The fluorinated copolymer composition according to [10] or [11], wherein in the formula (7), three $R^{71}$ are the same.
[13] A crosslinked rubber article which is obtained by crosslinking the fluorinated copolymer in the fluorinated copolymer composition as defined in any one of [1] to [12].
[14] A method for producing a crosslinked rubber article, which comprises heating the fluorinated copolymer composition as defined in any one of [1] to [12] to from 100 to 400° C. for crosslinking the fluorinated copolymer in the fluorinated copolymer composition.

Advantageous Effects of Invention

According to the present invention, it is possible to provide a fluorinated copolymer composition whereby a crosslinked rubber article having a low compression set at high temperature can be formed, and a crosslinked rubber article.

DESCRIPTION OF EMBODIMENTS

The meanings of terms in the present invention are as follows.

A "unit" is a generic term for an atomic group directly formed by polymerization of a monomer and derived from a single molecule of the above monomer, and an atomic group obtained by chemical conversion of a portion of the above atomic group. "Units based on a monomer" may hereinafter be simply referred to also as "units".

"Rubber" means rubber showing properties defined by JIS K6200 (2008), and is distinguished from "resin".

"Melting point" means a temperature corresponding to the maximum value of a melting point peak measured by a differential scanning calorimetry (DSC) method.

Unless otherwise specified, the boiling point means a boiling point under atmospheric pressure (1,013 hPa).

[Fluorinated Copolymer Composition]

The fluorinated copolymer composition of the present invention (hereinafter referred to also as "the present composition") comprises a fluorinated copolymer, an organic peroxide, a compound having at least two polymerizable unsaturated bonds (hereinafter referred to also as "specific polymerizable compound") and a phosphorus compound having a melting point of 60° C. or lower (hereinafter referred to also as "specific phosphorus compound"). The specific phosphorus compound is a crosslinking accelerating agent.

The crosslinked rubber article obtained by using the present composition has a low compression set at high temperature (for example, a compression set when a compression set test is carried out after storing a crosslinked rubber article at 250° C. for 168 hours). The details of the reason for this have not been clarified, but the following reasons are estimated.

As one reason why the compression set will be high at high temperature, it is considered that when a crosslinked rubber article is thermally compressed, bonds of crosslinked parts are broken. Here, the specific phosphors compound contained in the present composition has a low melting point, and accordingly when the fluorinated copolymer contained in the present composition is crosslinked with heating, the specific phosphorus compound is in a liquid state in the present composition. Thus, the specific phosphorus compound is dispersed well in the present composition, and the crosslinking of the fluorinated copolymer progresses well, whereby the crosslinking density is improved. As a result, it is considered that the compression set at high temperature will be low.

Further, it is considered that by using the specific polymerizable compound in the present composition, cleavage of crosslinking can be suppressed, and a crosslinked rubber article is less likely to be deformed even at high temperature.

As described above, it is assumed that the function of the specific phosphorus compound and the function of the specific polymerizable compound are synergistically affected, whereby a crosslinked rubber article having a low compression set at high temperature is obtained.

<Fluorinated Copolymer>

The fluorinated copolymer is not particularly restricted, so long as it is a polymer having fluorine atoms and having properties of a rubber by crosslinking, however, a fluorinated copolymer having monomer units having a fluorine atom (hereinafter referred to also as "fluorinated monomer") is preferred, and a perfluoropolymer is particularly preferred, since the compression set when a crosslinked rubber article is stored for a long period at high temperature (for example, a compression set when a compression set test is carried out after storing a crosslinked rubber article at 250° C. for 336 hours (hereinafter referred to also as "compression set after heated for a long period") can be made further low.

Here, "perfluoropolymer" is a polymer having substantially no hydrogen atom bonded to a carbon atom and instead of such hydrogen atoms, having fluorine atoms and having a chain of carbon atoms as the main chain. The perfluoropolymer may have a multivalent atom other than a carbon atom at its side chain, and such a multivalent atom is preferably an oxygen atom.

Here, "having substantially no hydrogen atom" means the content of hydrogen atoms in the perfluoropolymer is 0.5 mass % or lower, and the content is preferably 0.1 mass % or lower, more preferably 0.07 mass % or lower, particularly preferably 0.05 mass % or lower. When the content of hydrogen atoms falls within the above range, good heat resistance or good chemical resistance tends to be obtained.

Specific examples of the fluorinated monomer may be tetrafluoroethylene (hereinafter referred to also as "TFE"), a perfluoro(alkyl vinyl ether) (hereinafter referred to also as "PAVE"), vinylidene fluoride (hereinafter referred to also as "VdF"), hexafluoropropylene (hereinafter referred to also as "HFP") and chlorotrifluoroethylene (hereinafter referred to also as "CTFE").

PAVE units are units based on a perfluoro(alkyl vinyl ether).

PAVE is preferably a monomer represented by the formula (1), since the polymerization reactivity and the rubber properties will be excellent:

$$CF_2=CF-O-R^{f1} \quad (1)$$

In the formula (1), $R^{f1}$ represents a $C_{1-10}$ perfluoroalkyl group. The number of carbon atoms in $R^{f1}$ is preferably from 1 to 8, more preferably from 1 to 6, further preferably from 1 to 5, particularly preferably from 1 to 3, since the polymerization reactivity will be superior.

The perfluoroalkyl group may be linear or branched.

Specific examples of PAVE may be perfluoro(methyl vinyl ether) (hereinafter referred to also as "PMVE"), perfluoro(ethyl vinyl ether) (hereinafter referred to also as "PEVE") and perfluoro(propyl vinyl ether) (hereinafter referred to also as "PPVE"), and among them, PMVE and PPVE are preferred.

The fluorinated copolymer may have units based on a monomer other than the above (hereinafter referred to also as "other monomer"). Specific examples of such other monomer may be a monomer having at least two polymerizable unsaturated bonds (hereinafter referred to also as "DV"), a monomer represented by the following formula (5), ethylene and propylene. Further, a monomer having a halogen atom (hereinafter referred to also as "monomer having other halogen atom") other than the above fluorinated monomer, DV and the monomer represented by the formula (5) (for example, bromotrifluoroethylene and iodotrifluoroethylene) may be mentioned.

DV units are units based on a monomer having at least two polymerizable unsaturated bonds.

Specific examples of the polymerizable unsaturated bond may be a double bond of carbon atom-carbon atom (C=C) and a triple bond of carbon atom-carbon atom (C≡C).

The number of the polymerizable unsaturated bonds in DV is preferably from 2 to 6, more preferably 2 or 3, particularly preferably 2, since the polymerization reactivity will be superior.

DV further preferably has a fluorine atom, since the crosslinked rubber article will have a lower compression set at high temperature.

DV is preferably a monomer represented by the formula (2), since the crosslinked rubber article will have a lower compression set at high temperature:

$$(CR^{21}R^{22}\!=\!CR^{23})_{a2}R^{24} \qquad (2)$$

In the formula (2), $R^{21}$, $R^{22}$ and $R^{23}$ each independently represent a hydrogen atom, a fluorine atom, a methyl group or a trifluoromethyl group, a2 is an integer of from 2 to 6, and $R^{24}$ represents an a2 valent $C_{1-10}$ perfluorohydrocarbon group or a group having an etheric oxygen atom at a terminal or in a carbon-carbon bond of said perfluorohydrocarbon group. A plurality of $R^{21}$, a plurality of $R^{22}$ and a plurality $R^{23}$ may be the same or different from one another, respectively, and it is particularly preferred that they are the same.

a2 is preferably 2 or 3, particularly preferably 2.

Since the polymerization reactivity of DV will be superior, it is preferred that $R^{21}$, $R^{22}$ and $R^{23}$ are fluorine atoms or hydrogen atoms, it is more preferred that all of $R^{21}$, $R^{22}$ and $R^{23}$ are fluorine atoms or hydrogen atoms, and from the point of the heat resistance and the chemical resistance of the crosslinked rubber article, it is particularly preferred that all of $R^{21}$, $R^{22}$ and $R^{23}$ are fluorine atoms.

$R^{24}$ may be linear, branched or cyclic, preferably linear or branched, particularly preferably linear. The number of carbon atoms in $R^{24}$ is preferably from 2 to 8, more preferably from 3 to 7, further preferably from 3 to 6, particularly preferably from 3 to 5.

$R^{24}$ may have an etheric oxygen atom or may have no etheric oxygen atom, however, since the crosslinking reactivity and the rubber properties will be superior, $R^{24}$ preferably has an etheric oxygen atom.

The number of etheric oxygen atoms in $R^{24}$ is preferably from 1 to 6, more preferably from 1 to 3, particularly preferably 1 or 2. $R^{24}$ preferably has an etheric oxygen atom at a terminal of $R^{24}$.

Among the monomers represented by the formula (2), specific examples of a preferred monomer may be a monomer represented by the formula (3) and a monomer represented by the formula (4).

$$(CF_2\!=\!CF)_2R^{31} \qquad (3)$$

In the formula (3), $R^{31}$ represents a bivalent $C_{1-10}$ perfluorohydrocarbon group or a group having an etheric oxygen atom at a terminal or in a carbon-carbon bond of said perfluorohydrocarbon group.

Specific examples of the monomer represented by the formula (3) may be $CF_2\!=\!CFO(CF_2)_2OCF\!=\!CF_2$, $CF_2\!=\!CFO(CF_2)_3OCF\!=\!CF_2$, $CF_2\!=\!CFO(CF_2)_4OCF\!=\!CF_2$, $CF_2\!=\!CFO(CF_2)_6OCF\!=\!CF_2$, $CF_2\!=\!CFO(CF_2)_8OCF\!=\!CF_2$, $CF_2\!=\!CFO(CF_2)_2OCF(CF_3)CF_2OCF\!=\!CF_2$, $CF_2\!=\!CFO(CF_2)_2O(CF(CF_3)CF_2O)_2CF\!=\!CF_2$, $CF_2\!=\!CFOCF_2(CF_2CF_2O)_2CF\!=\!CF_2$, $CF_2\!=\!CFO(CF_2O)_3O(CF(CF_3)CF_2O)_2CF\!=\!CF_2$, $CF_2\!=\!CFOCF_2CF(CF_3)O(CF_2)_2OCF(CF_3)CF_2OCF\!=\!CF_2$, and $CF_2\!=\!CFOCF_2CF_2O(CF_2O)_2CF_2CF_2OCF\!=\!CF_2$.

Among the monomers represented by the formula (3), specific examples of a more preferred monomer may be $CF_2\!=\!CFO(CF_2)_3OCF\!=\!CF_2$ (hereinafter referred to also as "C3DVE") and $CF_2\!=\!CFO(CF_2)_4OCF\!=\!CF_2$ (hereinafter referred to also as "C4DVE" or "PBDVE").

$$(CH_2\!=\!CH)_2R^{41} \qquad (4)$$

In the formula (4), $R^{41}$ represents a bivalent $C_{1-10}$ perfluorohydrocarbon group or a group having an etheric oxygen atom at a terminal or in a carbon-carbon bond of said perfluorohydrocarbon group.

Specific examples of the monomer represented by the formula (4) may be $CH_2\!=\!CH(CF_2)_2CH\!=\!CH_2$, $CH_2\!=\!CH(CF_2)_4CH\!=\!CH_2$ and $CH_2\!=\!CH(CF_2)_6CH\!=\!CH_2$. Among the monomers represented by the formula (4), specific examples of a more preferred monomer may be $CH_2\!=\!CH(CF_2)_6CH\!=\!CH_2$ (hereinafter referred to also as "C6DV").

When DV is copolymerized, the polymerizable double bond at a terminal of DV reacts during the polymerization, whereby a fluorinated copolymer having a branched chain is obtained.

The formula (5) is as follows:

$$CF_2\!=\!CF\!-\!O\!-\!R^{f2} \qquad (5)$$

In the formula (5), $R^{f2}$ represents a $C_{1-8}$ perfluoroalkyl group having from 1 to 5 etheric oxygen atoms. The number of carbon atoms in $R^{f2}$ is preferably from 1 to 6, particularly preferably from 1 to 5.

Specific examples of the monomer represented by the formula (5) may be perfluoro(3,6-dioxa-1-heptene), perfluoro(3,6-dioxa-1-octene) and perfluoro(5-methyl-3,6-dioxa-1-nonene).

Preferred combinations of the units contained in the fluorinated copolymer are shown below.

Combination 1: combination of TFE units and PAVE units
  Combination 2: combination of TFE units, PAVE units and DV units
  Combination 3: combination of VdF units and HFP units
  Combination 4: combination of VdF units, HFP units and TFE units Among them, the combination 1 and the combination 2 are preferred, and the combination 2 is particularly preferred, from the point of the heat resistance and the chemical resistance of a crosslinked rubber article.

The copolymer compositions in the combinations 1 to 4 preferably have the following molar ratios. At the following molar ratios, the heat resistance and the chemical resistance of a crosslinked rubber article will be excellent.

Combination 1: TFE units/PAVE units=60 to 80/20 to 40 (molar ratio)
  Combination 2: TFE units/PAVE units/DV units=60 to 80/20 to 40/0.01 to 1 (molar ratio)
  Combination 3: VdF units/HFP units=60 to 95/5 to 40 (molar ratio)
  Combination 4: VdF units/HFP units/TFE units=30 to 50/5 to 45/5 to 65 (molar ratio)

The fluorinated copolymer may have iodine atoms. In such a case, the fluorinated copolymer preferably has iodine atoms at a terminal of the fluorinated copolymer (polymer chain). It is considered that the iodine atoms which are present in the fluorinated copolymer leave from the fluorinated copolymer at the time of crosslinking and are captured by the specific phosphorus compound.

As iodine atoms, iodine atoms derived from an iodine compound which functions as the after mentioned chain transfer agent and iodine atoms in units based on a monomer having an iodine atom among the above mentioned monomers having other halogen atom such as iodotrifluoroethylene may be mentioned, and iodine atoms derived from an iodine compound which functions as the chain transfer agent are preferred.

When the fluorinated copolymer has iodine atoms, the content of iodine atoms is preferably from 0.01 to 5.0 mass %, more preferably from 0.05 to 2.0 mass %, particularly preferably from 0.05 to 1.0 mass % to the total mass of the fluorinated copolymer. When the content of iodine atoms falls within the above range, the crosslinking reactivity of the fluorinated copolymer is improved, whereby the mechanical properties of a crosslinked rubber article will be excellent.

As the fluorinated copolymer contained in the fluorinated copolymer composition of the present invention, a perfluoropolymer having iodine atoms is most preferred. When the fluorinated copolymer is the perfluoropolymer having iodine atoms, the crosslinking reaction relatively quickly proceeds, and it is thereby considered that more iodine atoms leave from the fluorinated copolymer. It is considered that when the above mentioned fluorinated copolymer is crosslinked in the presence of the specific phosphorus compound, the specific phosphorus compound captures many iodine atoms, whereby the crosslinking reaction is accelerated.

The content of the fluorinated copolymer is preferably from 60 to 99 mass %, more preferably from 70 to 99 mass %, particularly preferably from 80 to 99 mass %, to the total mass of the present composition.

(Method for Producing Fluorinated Copolymer)

One example of the method for producing the fluorinated copolymer may be a method of copolymerizing the above-mentioned monomers in the presence of a radical polymerization initiator.

As the radical polymerization initiator, a water-soluble polymerization initiator or a redox polymerization initiator is preferred.

Specific examples of the water-soluble polymerization initiator may be persulfates such as ammonium persulfate, sodium persulfate and potassium persulfate, and organic polymerization initiators such as disuccinic acid peroxide and azobisisobutylamidine dihydrochloride, and among them, persulfates are preferred, and ammonium persulfate is more preferred.

As the redox polymerization initiator, a polymerization initiator having a persulfate and a reducing agent combined, may be mentioned. Among them, a polymerization initiator capable of polymerizing each monomer at a polymerization temperature in a range of from 0 to 60° C. is preferred. Specific examples of the persulfate to constitute the redox polymerization initiator may be alkali metal salts of persulfate such as ammonium persulfate, sodium persulfate and potassium persulfate, and ammonium persulfate is preferred. Specific examples of the reducing agent to be combined with the persulfate may be a thiosulfate, a sulfite, a hydrogen sulfite, a pyrosulfite and a hydroxymethanesulfinate, a hydroxymethanesulfinate is preferred, and sodium hydroxymethanesulfinate is particularly preferred.

In the method for producing the fluorinated copolymer, the above-mentioned monomers may be copolymerized in the presence of a chain transfer agent with the radical polymerization initiator.

The chain transfer agent is preferably an iodine compound, particularly preferably an iodine compound represented by the formula $RI_2$. In the above formula, R represents an alkylene group or perfluoroalkylene group having at least 3 (preferably from 3 to 8) carbon atoms.

Specific examples of the iodine compound represented by the formula $RI_2$ may be 1,3-diiodopropane, 1,4-diiodobutane, 1,6-diiodohexane, 1,8-diiodooctane, 1,3-diiodoperfluoropropane, 1,4-diiodoperfluorobutane, 1,6-diiodoperfluorohexane and 1,8-diiodoperfluorooctane.

As the iodine compound, an iodine compound having a perfluoroalkylene group is preferred, and 1,4-diiodoperfluorobutane is particularly preferred.

When the above monomers are copolymerized in the presence of such an iodine compound, iodine atoms can be introduced into the fluorinated copolymer.

With respect to details of the components other than the above to be used in the production of the fluorinated copolymer and the production method, reference may be made to the method described in paragraphs 0019 to 0034 of WO2010/082633.

<Organic Peroxide>

The organic peroxide is used as a crosslinking agent.

Specific examples of the organic peroxide may be dialkyl peroxides, α,α'-bis(tert-butylperoxy)-p-diisopropylbenzene, α,α'-bis(tert-butylperoxy)-m-diisopropylbenzene, benzoyl peroxide, tert-butylperoxybenzene, 2,5-dimethyl-2,5-di(benzoylperoxy)hexane, tert-butyl cumyl peroxide and dicumyl peroxide.

Specific examples of the dialkyl peroxide may be 1,1-di(tert-butylperoxy)-3,3,5-trimethylcyclohexane, 2,5-dimethylhexane-2,5-dihydroxy peroxide, 2,5-dimethyl-2,5-di(tert-butylperoxy)hexane, 2,5-dimethyl-2,5-di(tert-butylperoxy)-3-hexyne, tert-butylperoxymaleate, and tert-butylperoxyisopropyl carbonate.

The content of the organic peroxide is from 0.3 to 10 parts by mass, preferably from 0.3 to 5 parts by mass, particularly preferably from 0.5 to 3 parts by mass, per 100 parts by mass of the fluorinated copolymer. When the content of the organic peroxide falls within the above range, the balance between the hardness and the elongation of a crosslinked rubber article will be excellent.

<Specific Polymerizable Compound>

The specific polymerizable compound is a compound having at least two polymerizable unsaturated bonds and is used as a crosslinking co-agent to improve the crosslinking reactivity of the fluorinated copolymer.

Specific examples of the polymerizable unsaturated bond may be a double bond (C=C) of carbon atom-carbon atom and a triple bond (C≡C) of carbon atom-carbon atom, and the double bond (C=C) of carbon atom-carbon atom is preferred, since the crosslinking reactivity will be superior.

The number of the polymerizable unsaturated bonds in the specific polymerizable compound is at least 2, preferably from 2 to 6, more preferably 2 or 3, particularly preferably 2.

The specific polymerizable compound is preferably a compound having at least two vinyl groups or allyl groups, since the crosslinking reactivity will be superior, and the compression set at high temperature will be further low.

The specific polymerizable compound preferably has a fluorine atom, since the weather resistance and the chemical resistance of a crosslinked rubber article will be excellent.

Specific examples of the specific polymerizable compound may be a compound represented by the following formula (6), triallyl cyanurate, triallyl isocyanurate and trimethallyl isocyanurate. The compound represented by the following formula (6) and triallyl isocyanurate are preferred, since the crosslinking reactivity will be superior, and the compound represented by the following formula (6) is particularly preferred, since the compression set of a crosslinked rubber article after heated for a long period will be further low.

The formula (6) is as follows.

$$(CR^{61}R^{62}=CR^{63})_2R^{64} \qquad \text{Formula (6)}$$

In the formula (6), $R^{61}$, $R^{62}$ and $R^{63}$ each independently represent a hydrogen atom, a fluorine atom, a $C_{1-5}$ alkyl group or a $C_{1-5}$ fluoroalkyl group, and $R^{64}$ represents a bivalent $C_{1-18}$ fluorohydrocarbon group or a group having an etheric oxygen atom at a terminal or in a carbon-carbon bond of the fluorohydrocarbon group. Two $R^{61}$, two $R^{62}$ and two $R^{63}$ may, respectively, be the same or different from each other.

The alkyl groups or the fluoroalkyl groups in $R^{61}$, $R^{62}$ and $R^{63}$ may be linear or branched, but are preferably linear.

The number of carbon atoms in the alkyl groups or the fluoroalkyl groups in $R^{61}$, $R^{62}$ and $R^{63}$ is from 1 to 5, preferably from 1 to 3, particularly preferably 1 or 2.

From such a viewpoint that the crosslinking reactivity will be superior, it is preferred that all of $R^{61}$, $R^{62}$ and $R^{63}$ are hydrogen atoms.

The fluorohydrocarbon group in $R^{64}$ is preferably a perfluorohydrocarbon group, from such a viewpoint that the heat resistance of a crosslinked rubber article will be superior.

$R^{64}$ may be any of linear, branched or cyclic, but is preferably linear or branched, particularly preferably linear. The number of carbon atoms in $R^{64}$ is from 1 to 18, preferably from 2 to 8, particularly preferably from 3 to 7.

In a case where $R^{64}$ has an etheric oxygen atom, the number of etheric oxygen atoms in $R^{64}$ is preferably from 1 to 6, more preferably from 1 to 3, particularly preferably 1 or 2. In a case where $R^{64}$ has an etheric oxygen atom, it is preferred that the etheric oxygen atom is present at a terminal of $R^{64}$.

As the compound represented by the formula (6), a compound represented by the above-mentioned formula (2) is preferred, and compounds represented by the above-mentioned formula (3) and the above-mentioned formula (4) are more preferred. Among the compounds represented by the formula (3) and the formula (4), C3DVE, C4DVE, $CH_2=CH(CF_2)_2CH=CH_2$, $CH_2=CH(CF_2)_4CH=CH_2$ and C6DV are preferred, and C6DV is particularly preferred, since the compression set of a crosslinked rubber article after heated for a long period will be further low.

The content of the specific polymerizable compound is from 0.03 to 5 parts by mass, preferably from 0.1 to 4 parts by mass, particularly preferably from 0.3 to 3 parts by mass, per 100 parts by mass of the fluorinated copolymer. When it is at least the lower limit value in the above range, the compression set of a crosslinked rubber article will be further low, and when it is at most the upper limit value in the above range, the crosslinking reactivity will be superior.

<Specific Phosphorus Compound>

The specific phosphorus compound is a phosphorus compound having a melting point of 60° C. or lower which is used as a crosslinking accelerating agent.

The melting point of the specific phosphorus compound is 60° C. or lower, and since the dispersibility of the phosphorus compound is further improved, and the compression set at high temperature of a crosslinked rubber article will be further low, preferably 35° C. or lower, particularly preferably 20° C. or lower.

Here, a compound which is liquid at 20° C. is also included in the above mentioned compound having a melting point of the specific temperature or lower.

The specific phosphorus compound is preferably a phosphine having an alkyl group, more preferably trialkylphosphine, particularly preferably a compound represented by the following formula (7), since the dispersibility of the specific phosphorus compound is further improved, and the compression set of a crosslinked rubber article at high temperature will be further low:

$$P(R^{71})_3 \qquad \text{formula (7)}$$

In the formula (7), $R^{71}$ represents a $C_{2-9}$ linear or branched alkyl group. Three $R^{71}$ may be the same or different from one another, however, they are preferably the same, since the compression set of a crosslinked rubber article at high temperature will be further low.

The number of carbon atoms in $R^{71}$ is from 2 to 9 and preferably from 4 to 9, particularly preferably from 6 to 8, since the compression set of a crosslinked rubber article at high temperature will be further low.

Three $R^{71}$ are each independently preferably a $C_{2-9}$ linear alkyl group, since the compression set of a crosslinked rubber article at high temperature will be further low.

Specific examples of the specific phosphorus compound may be triethylphosphine (melting point of −86° C., liquid at 20° C.), tri-n-propylphosphine (melting point is unknown, liquid at 20° C.), tri-n-butylphosphine (melting point of −65° C., liquid at 20° C.), tri-n-pentylphosphine (melting point is unknown, liquid at 20° C.), tri-n-hexylphosphine (melting point is unknown, liquid at 20° C.), and tri-n-octylphosphine (melting point is unknown, liquid at 20° C.). Among the specific phosphorus compounds, tri-n-octylphosphine is preferred, since the compression set of a crosslinked rubber article at high temperature will be further low.

The content of the specific phosphorus compound is preferably from 0.01 to 5 parts by mass, more preferably from 0.05 to 2 parts by mass, particularly preferably from 0.1 to 1 parts by mass, per 100 parts by mass of the fluorinated copolymer. When it is at least the lower limit value of the above range, the compression set of a crosslinked rubber article will be further low, and when it is at most the upper limit value in the above range, the compression set of a crosslinked rubber article at high temperature will be further low.

<Other Components>

The present composition may contain components other than those mentioned above to such an extent that the effects of the invention are not impaired. Such other components may be acid acceptors (e.g. fatty acid esters, fatty acid metal salts, bivalent metal oxides (e.g. magnesium oxide, calcium oxide, zinc oxide, lead oxide, etc.)), fillers and reinforcing agents (e.g. carbon black, barium sulfate, calcium metasilicate, calcium carbonate, titanium oxide, silicon dioxide, a polytetrafluoroethylene (PTFE), a tetrafluoroethylene/perfluoro(alkyl vinyl ether) copolymer (PFA), clay, talc), scorch retardants (e.g. phenolic hydroxy group-containing compounds such as bisphenol A, etc., quinones such as hydroquinone, α-methylstyrene dimers such as 2,4-di(3-isopropylphenyl)-4-methyl-1-pentene, etc.), crown ethers (e.g. 18-crown-6, etc.) and lubricants (e.g. sodium stearate, etc.).

In a case where the present composition contains a powder of silicon dioxide among the above mentioned other components, the exposure resistance of a crosslinked rubber article to be obtained by using such a composition against oxygen plasma will be improved. Such a crosslinked rubber article is suitable for, for example, a component of a semiconductor production apparatus to apply an oxygen plasma treatment.

In a case where the present composition contains at least one of the PTFE powder and the PFA powder among the above mentioned components, the exposure resistance of a crosslinked rubber article obtained by using such a composition against plasma using fluorine gas will be improved.

Such a crosslinked rubber article is suitable for a component of a semiconductor production apparatus to apply a plasma treatment using fluorine gas.

In a case where the present composition contains other components, the total content of other components is preferably higher than 0.1 part by mass and 30 parts by mass or lower, more preferably from 1 to 25 parts by mass, particularly preferably from 5 to 15 parts by mass, per 100 parts by mass of the fluorinated copolymer.

As the method for preparing the present composition, a method of mixing the above-mentioned respective components may be mentioned. The mixing of the respective components may be carried out by using a mixing device for rubber, such as a roll, a kneader, a Banbury mixer or an extruder.

Further, after the above respective components are mixed to obtain a mixture, the mixture may be formed. Specific examples of the method of forming the mixture may be compression molding, injection molding, extrusion, calendering, and a method of dissolving the mixture in a solvent and applying the solution to e.g. a substrate by dipping or coating.

[Crosslinked Rubber Article]

The crosslinked rubber article of the present invention is a rubber article which is obtainable by crosslinking the fluorinated copolymer in the above mentioned fluorinated copolymer composition.

As the method for crosslinking the fluorinated copolymer in the fluorinated copolymer composition, a method of crosslinking the fluorinated copolymer by heating the fluorinated copolymer composition is preferred.

As specific examples of the crosslinking method by heating, heat press crosslinking, steam crosslinking, and hot air crosslinking may be mentioned, from such methods, a suitable method may be properly selected in consideration of the form and application of the fluorinated copolymer composition.

The heating conditions are preferably at from 100 to 400° C. for from 1 second to 24 hours.

The crosslinked rubber that has been primarily crosslinked by heating the fluorinated copolymer composition may be further heated for secondary crosslinking. By conducting the secondary crosslinking, it is possible to stabilize or improve the mechanical properties, compression set and other properties of the crosslinked rubber.

In a case where the primary crosslinking and the secondary crosslinking are carried out, the heating temperature for the primary crosslinking is preferably from 100 to 400° C., more preferably from 120 to 200° C., further preferably from 140 to 180° C.

In a case where the primary crosslinking and the secondary crosslinking are carried out, the heating temperature for the secondary crosslinking is preferably from 80 to 350° C., more preferably from 140 to 300° C., further preferably from 220 to 260° C.

In a case where the primary crosslinking and the secondary crosslinking are carried out, the heating time for the primary crosslinking is preferably from 1 second to 60 minutes, more preferably from 1 minute to 40 minutes, further preferably from 5 minutes to 30 minutes.

In a case where the primary crosslinking and the secondary crosslinking are carried out, the heating time for the secondary crosslinking is preferably from 30 minutes to 48 hours, more preferably from 2 hours to 32 hours, further preferably from 3 hours to 25 hours.

Heating conditions at the time of conducting the secondary crosslinking are preferably from 80 to 350° C. for from 30 minutes to 48 hours.

A crosslinking method other than crosslinking by heating the fluorinated copolymer composition, may be a method of crosslinking the fluorinated copolymer by irradiating the fluorinated copolymer composition with radiation. Specific examples of the radiation to be applied may be electron beams and ultraviolet rays.

<Physical Properties>

The compression set of the crosslinked rubber article at 250° C. for 168 hours is preferably 95% or lower, and it is more preferably 70% or lower, particularly preferably 50% or lower, since the fluorinated copolymer is crosslinked well, and the shape recovery of the crosslinked rubber article after pressurization will be superior.

The compression set of the crosslinked rubber article at 250° C. for 168 hours is measured by the method described in the after described Examples.

<Applications>

The crosslinked rubber article is suitable as a material for e.g. O-rings, sheets, gaskets, oil seals, diaphragms and V-rings. Further, it is also useful for applications, such as heat-resistant chemical-resistant sealing materials, heat-resistant oil-resistant sealing materials, electric wire coating materials, sealing materials for semiconductor manufacturing equipment, sealing materials for liquid crystal display panel manufacturing equipment, sealing materials for LED manufacturing equipment, corrosion-resistant rubber paints, sealing materials for urea-resistant grease, etc., rubber paints, adhesive rubber, hoses, tubes, calendered sheets (rolls), sponges, rubber rolls, members for oil drilling, heat dissipating sheets, solution crosslinkers, rubber sponges, bearing seals (urea resistant grease, etc.), lining (chemical resistant), automotive insulating sheets, insulating sheets for electronic equipment, rubber bands for watches, packings for endoscope (amine resistant), bellows hoses (processed from calendered sheets), packings/valves for water heaters, fenders (marine civil engineering, ships), fibers and nonwoven fabrics (protective clothing, etc.), sealing materials for substrate, rubber gloves, stators for uniaxial eccentric screw pumps, parts for urea SCR systems, vibration isolators, damping agents, sealants, additives to other materials, and toys.

EXAMPLES

Hereinafter, the present invention will be described in detail with reference to Examples. Ex. 1 and Ex. 2 are Examples of the present invention, and Ex. 3 and Ex. 4 are Comparative Examples. However, the present invention is not limited to these Examples. The blend amounts of the respective components in Table given later are based on mass.

[Measurement of Composition of Fluorinated Copolymer]

The contents (mol %) of the respective units in a fluorinated copolymer were calculated by the nuclear magnetic resonance ($^{19}$F-NMR) analysis. Here, the content of propylene units was calculated by $^{13}$C-nuclear magnetic resonance (NMR) analysis.

Further, the content of iodine atoms in a fluorinated copolymer was calculated by a device having an automatic sample combustion system pretreatment system for ion chromatography (manufactured by Mitsubishi Chemical Analytech, AQF-100 model) and an ion chromatograph combined.

[Compression Set at High Temperature]

The compression set (%) when a test specimen of a crosslinked rubber article was stored at 250° C. for 168 hours, was measured in accordance with JIS K 6262:2013. Here, as the test specimen, an O-ring test specimen of P26 in accordance with JIS B 2401-1: 2012 was used. The test was carried out by using three pieces of the test specimen, and an arithmetic mean of measured values of three pieces of the test specimen was used.

The compression set was calculated by the following formula, and the compression set at high temperature was evaluated based on the following evaluation standard. Here, the specimen is superior as the compression set is closer to 0%, it is superior.

$$\text{Compression set (\%)} = (\text{thickness of original test specimen} - \text{thickness of test specimen 30 minutes after removed from compression apparatus}) \div (\text{thickness of original specimen} - \text{thickness of spacer}) \times 100$$

<Evaluation Standard>
A: Compression set is 0% or higher and 50% or lower
B: Compression set is higher than 50% and 70% or lower
C: Compression set is higher than 70% and 95% or lower
D: Compression set is higher than 95%

[Compression Set After Heated for Long Period]

The compression set after heated for a long period was evaluated by the same procedure and evaluation standard as in the above mentioned "Compression set at high temperature", except that the time for storing a test specimen of a crosslinked rubber article at 250° C. was changed to 336 hours, instead of 168 hours.

[Production of Fluorinated Copolymer 1]

A stainless steel pressure resistant reactor equipped with anchor blades and having an internal volume of 20 L, was deaerated, then 8.2 L of ultrapure water, 733 g of a 30 mass % solution of $C_2F_5OCF_2CF_2OCF_2COONH_4$, 10.0 g of C3DVE and 15.9 g of a 5 mass % aqueous solution of disodium hydrogen phosphate·12 hydrate, were charged, and the gas phase was substituted with nitrogen. While stirring at a rate of 375 rpm by using the anchor blades, when the internal temperature became 80° C., 198 g of TFE and 454 g of PMVE were injected into the reactor. The inner pressure of the reactor was 0.90 MPa (gauge). 40 mL of a 1 mass % aqueous solution of ammonium persulfate was added to initiate polymerization. When the ratio of added monomers injected before the initiation of polymerization (hereinafter referred to as initial monomers) is, as represented by a molar ratio, TFE:PMVE:C3DVE=41.74:57.64:0.61.

At the time when the inner pressure of the reactor decreased to 0.89 MPa (gauge) along with the progress of polymerization, TFE was injected to raise the inner pressure of the reactor to 0.90 MPa (gauge). This operation was repeated, and every time when 80 g of TFE was injected, 62 g of PMVE was also injected. Further, 7.0 g of 1,4-diiodoperfluorobutane was injected from an ample tube into the reactor together with 50 mL of ultrapure water, at the time when 60 g of TFE was injected.

At the time when the total mass of TFE added reached 1,200 g, addition of monomers injected after the initiation of polymerization (hereinafter referred to as "post addition monomers"), was terminated, and the inner temperature of the reactor was decreased to 10° C. to terminate the polymerization reaction thereby to obtain a latex containing a fluorinated copolymer. The polymerization time was 360 minutes. Further, the total mass of the post addition monomers added was such that TFE was 1,200 g and PMVE was 868 g, and when this is converted to a molar ratio, TFE:PMVE=68:32.

Nitric acid (manufactured by Kanto Chemical Co., Inc., special grade) was dissolved in ultrapure water to prepare a 3 mass % aqueous solution of nitric acid. The latex was added to the nitric acid aqueous solution in a container made of a TFE/perfluoro(alkyl vinyl ether) copolymer (PFA) to precipitate the fluorinated copolymer. The amount of the nitric acid aqueous solution to 100 parts by mass of the fluorinated copolymer in the latex, was 150 parts by mass.

The precipitated fluorinated copolymer was recovered by filtration, and put into ultrapure water in a container made of PFA, followed by stirring at 200 rpm for 30 minutes for washing. The amount of ultrapure water to 100 parts by mass of the fluorinated copolymer was 100 parts by mass. The above washing was repeated 10 times.

The washed fluorinated copolymer was recovered by filtration, and vacuum-dried at 50° C. under 10 kPa to obtain fluorinated copolymer 1. The molar ratio of the respective units in the fluorinated copolymer 1 was TFE units:PMVE units:C3DVE units=71.40:28.43:0.17, and the content of iodine atoms was 0.10 mass %.

[Fluorinated Copolymer 2]

Fluorinated rubber-1 in Examples of JP-A-H06-306236 was used as fluorinated copolymer 2. The molar ratio of respective units in the fluorinated copolymer 2 was VdF units:TFE units:popylene units=35:40:25. No iodine atom was contained.

EX. 1 TO 4

The components in blending amounts as identified in Table 1 were kneaded by a two-roll mill for 10 minutes at room temperature to obtain mixed fluorinated copolymer compositions.

The obtained fluorinated copolymer compositions were heat-pressed under the primary crosslinking conditions shown in Table 1 to obtain crosslinked rubber sheets having a thickness of 1 mm (primary crosslinking). Then, the crosslinked rubber sheets were heated in an oven in a nitrogen atmosphere under the secondary crosslinking conditions shown in Table 1 (secondary crosslinking). Then, the crosslinked rubber sheets were cooled to room temperature to obtain crosslinked rubber sheets of Ex. 1 to 4.

Using the obtained crosslinked rubber sheets, the above-mentioned physical properties were measured. The measurement results are shown in Table 1.

A summary of the respective components listed in Table 1, except for the fluorinated copolymers, is given below.

Perhexa 25B: Trade name, manufactured by Nippon Oil & Fats, Co., Ltd. 2,5-dimethyl-2,5-di(tert-butylperoxy) hexane, organic peroxide Perkadox 14: Trade name, manufactured by Kayaku Akzo Corporation, α,α'-bis(tert-butylperoxy)-p-diisopropylbenzene, organic peroxide TAIC: Trade name, manufactured by Mitsubishi Chemical Corporation, triallyl isocyanate, specific polymerizable compound C6DV: manufactured by Tosoh Finechem Corporation, $CH_2=CH(CF_2)_6CH=CH_2$, specific polymerizable compound TOCP: manufactured by HOKKO CHEMICAL INDUSTRY CO., LTD., tri-n-octylphosphine (liquid at 20° C.), specific phosphorus compound

TABLE 1

|  |  | Ex. 1 | Ex. 2 | Ex. 3 | Ex. 4 |
| --- | --- | --- | --- | --- | --- |
| Fluorinated copolymer | Fluorinated copolymer 1 | 100 | 100 | 100 | 0 |
|  | Fluorinated copolymer 2 | 0 | 0 | 0 | 100 |
| Organic peroxide | Perhexa 25B | 0.5 | 1 | 0.5 | 1 |
|  | Perkadox 14 | 0 | 0 | 0 | 1 |
| Specific polymerizable compound | TAIC | 0.5 | 0 | 0.5 | 0 |
|  | C6DV | 0 | 2 | 0 | 0 |
| Specific phosphorus compound | TOCP | 0.2 | 0.2 | 0 | 0.5 |
| Crosslinking conditions | Primary crosslinking conditions | 150° C. for 20 min | 170° C. for 20 min | 150° C. for 20 min | 170° C. for 10 min |
|  | Secondary crosslinking conditions | 250° C. for 4 hours | 250° C. for 24 hours | 250° C. for 4 hours | 230° C. for 24 hours |
| Compression set at high temperature |  | C | A | D | D |
| Compression set after heated for long period |  | D | B | D | D |

As shown in Table 1, it has been confirmed that by using a fluorinated copolymer composition (Ex. 1 and Ex. 2) comprising a fluorinated copolymer, an organic peroxide, a specific polymerizable compound and a specific phosphorus compound, the compression set at high temperature could be made low.

This application is a continuation of PCT Application No. PCT/JP2020/039268, filed on Oct. 19, 2020, which is based upon and claims the benefit of priority from Japanese Patent Application No. 2019-192839 filed on Oct. 23, 2019. The contents of those applications are incorporated herein by reference in their entireties.

What is claimed is:

1. A fluorinated copolymer composition, comprising:
    a fluorinated copolymer comprising substantially no hydrogen atoms;
    an organic peroxide;
    a compound having at least two polymerizable unsaturated bonds; and
    a phosphorus compound having a melting point of 60° C. or lower,
    wherein the compound having at least two polymerizable unsaturated bonds is a compound of formula (6), $(CR^{61}R^{62}=CR^{63})_2R^{64}$, where $R^{61}$, $R^{62}$ and $R^{63}$ are each independently a hydrogen atom, a fluorine atom, a $C_{1-5}$ alkyl group or a $C_{1-5}$ fluoroalkyl group, $R^{64}$ is a bivalent $C_{1-18}$ fluorohydrocarbon group or a group having an etheric oxygen atom at a terminal or in a carbon-carbon bond of the fluorohydrocarbon group, and two $R^{61}$, two $R^{62}$ and two $R^{63}$ may be the same or different from each other, respectively.

2. The fluorinated copolymer composition according to claim 1, wherein the phosphorus compound has a melting point of 35° C. or lower.

3. The fluorinated copolymer composition according to claim 1, wherein the phosphorus compound is a phosphine having an alkyl group.

4. The fluorinated copolymer composition according to claim 1, wherein the fluorinated copolymer is a perfluoropolymer.

5. The fluorinated copolymer composition according to claim 1, wherein the fluorinated copolymer has units based on tetrafluoroethylene and units based on a perfluoro(alkyl vinyl ether).

6. The fluorinated copolymer composition according to claim 5, wherein the fluorinated copolymer further has units based on a monomer having at least two polymerizable unsaturated bonds.

7. The fluorinated copolymer composition according to claim 1, wherein the compound having at least two polymerizable unsaturated bonds is a compound having at least two vinyl groups or allyl groups.

8. The fluorinated copolymer composition according to claim 1, wherein the phosphorus compound is a trialkylphosphine.

9. The fluorinated copolymer composition according to claim 1, wherein the phosphorus compound is a compound of formula (7), $P(R^{71})_3$, where $R^{71}$ is a $C_{2-9}$ linear or branched alkyl group, and the three $R^{71}$ may be the same or different from one another.

10. The fluorinated copolymer composition according to claim 9, where in the formula (7), the three $R^{71}$ are each independently a $C_{2-9}$ linear alkyl group.

11. The fluorinated copolymer composition according to claim 9, wherein in the formula (7), the three $R^{71}$ are the same.

12. A crosslinked rubber article which is obtained by crosslinking the fluorinated copolymer in the fluorinated copolymer composition of claim 1.

13. A method for producing a crosslinked rubber article, comprising:
    heating the fluorinated copolymer composition of claim 1 to from 100 to 400° C. such that the fluorinated copolymer in the fluorinated copolymer composition is crosslinked.

14. The fluorinated copolymer composition according to claim 1, wherein the fluorinated copolymer comprises at least one tetrafluoroethylene unit and at least one perfluoro (alkyl vinyl ether) unit and optionally at least one monomer having at least two polymerizable unsaturated bonds.

15. The fluorinated copolymer composition according to claim 1, wherein the fluorinated copolymer comprises at least one vinylidene fluoride unit and at least one hexafluoropropylene unit.

16. The fluorinated copolymer composition according to claim 15, wherein the fluorinated copolymer further comprises at least one tetrafluoroethylene unit.

17. The fluorinated copolymer composition according to claim 1, wherein the compound of formula (6) is at least one selected from the group consisting of $CF_2=CFO(CF_2)_3OCF=CF_2$, $CF_2=CFO(CF_2)_4OCF=CF_2$, $CH_2=CH(CF_2)_2CH=CH_2$, $CH_2=CH(CF_2)_4CH=CH_2$ and $CH_2=CH(CF_2)_6CH=CH_2$.

18. The fluorinated copolymer composition according to claim 17, wherein the compound of formula (6) is $CH_2=CH(CF_2)_6CH=CH_2$.

19. The fluorinated copolymer composition according to claim 1, wherein the compound of formula (6) has a content of from 0.03 parts by mass to 5 parts by mass per 100 parts by mass of the fluorinated copolymer.

20. The fluorinated copolymer composition according to claim 1, wherein the phosphorus compound is a compound of formula (7), $P(R^{71})_3$, where $R^{71}$ is a $C_{6-9}$ linear or branched alkyl group, and the three $R^{71}$ may be the same or different from one another.

21. The fluorinated copolymer composition according to claim 1, wherein the fluorinated copolymer comprises at least one tetrafluoroethylene unit and at least one perfluoro(alkyl vinyl ether) unit, and a molar ratio of the at least one tetrafluoroethylene unit to the at least one perfluoro(alkyl vinyl ether) unit is from 1.5 to 4.

* * * * *